Figure 1:
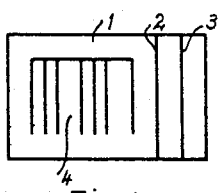

March 6, 1962 H. G. FEISSEL 3,023,960
ARRANGEMENT FOR MAGNETICALLY RECORDING
IN AN ACCOUNTING MACHINE
Filed Oct. 8, 1957 3 Sheets-Sheet 1

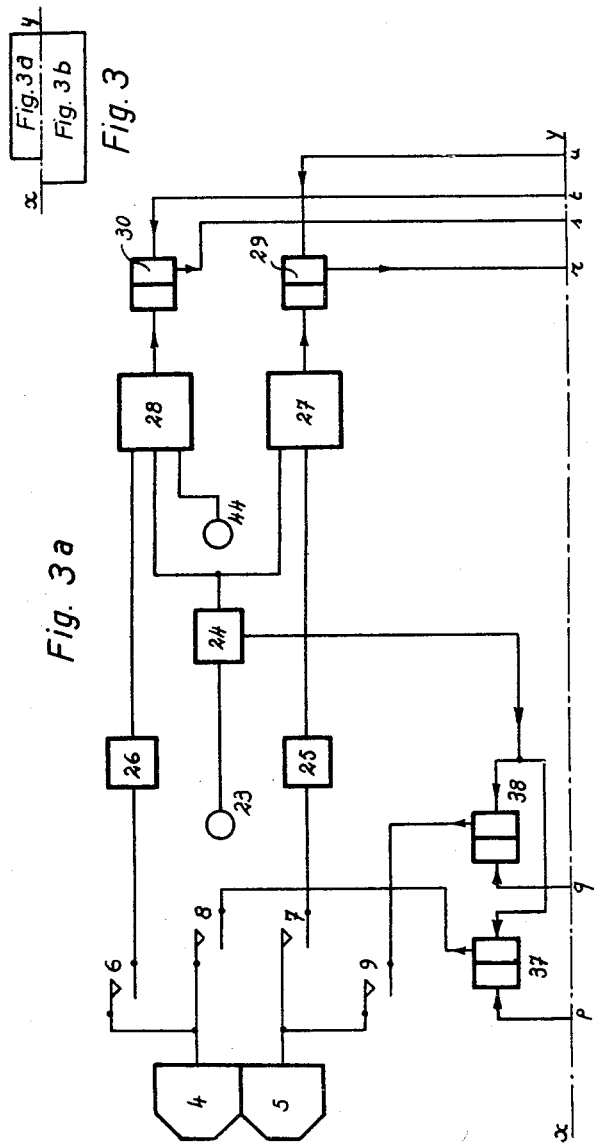

United States Patent Office 3,023,960
Patented Mar. 6, 1962

3,023,960
ARRANGEMENT FOR MAGNETICALLY RECORDING IN AN ACCOUNTING MACHINE
Henri G. Feissel, Paris, France, assignor to Machines Automatiques Modernes (Societe a Responsabilite Limitee), Paris, France
Filed Oct. 8, 1957, Ser. No. 688,901
Claims priority, application France Oct. 10, 1956
9 Claims. (Cl. 235—156)

This invention concerns an accounting machine comprising accumulators and utilising a record sheet, and relates principally to a method of magnetically recording on a record sheet as also to the control of the said recording.

In accounting machines comprising accumulators and utilising account sheets, it has been proposed to record the balances of accounts magnetically on the sheets. In the present device, the number of the account and a group of marks representing the sign of the balance are in addition recorded at the end of each operation.

It is known to effect the recording in the form of magnetic marks disposed in parallel columns, each column corresponding to a digit to be recorded, and the number of marks in each column being equal to the value of the corresponding digit. This latter arrangement has a number of disadvantages; it takes up a considerable amount of space on the record sheet, and it necessitates a magnetic head and an amplifier for each digit recorded. Finally, the control of the mechanical devices for recording the digits must be effected in a time not exceeding the period of the recorded pulses, which necessitates a very slow movement of the sheet, or very costly intermediate storage devices.

The device according to the invention obviates these disadvantages. For the purpose of increasing the period of the pulses belonging to the same digit of a number and actuating the same pulse counter, the device according to the invention is based on the principle of an interleaved series recording of the marks representing the consecutive digits or symbols to be recorded.

In a first arrangement according to the invention, a pulse generator generates pulses, some of which are transmitted to a magnetic head located opposite a magnetic track on the record sheet during the movement of the said sheet, so as to perform a complete recording of all the consecutive digits of symbols to be recorded.

In a second arrangement according to the invention, the recording on the magnetic track comprises successive positions, some of which bear magnetic marks and which correspond to the successive movements of the sheet past the magnetic head during the period of the emission of the successive pulses from the generator, the consecutive positions of a recording of any digit or symbol being separated by a constant number of positions equal to the total number of digits or symbols to be recorded.

In a third arrangement according to the invention, the pulse generator also applies marks to an auxiliary magnetic track by way of an auxiliary magnetic head, so that there corresponds to a position comprising a mark on the main track a position bearing no mark on the auxiliary track, while there corresponds to a position bearing no mark on the main track a position comprising a mark on the auxiliary track.

In a fourth arrangement according to the invention, the magnetic marks on the main track and on the auxiliary track are counted and the machine is stopped if the total of such marks does not correspond to the number of pulses from the pulse generator which have served to apply the said marks to one track or the other and also if two marks are simultaneously read on the two tracks.

In a fifth arrangement according to the invention, the pulse generator is controlled by the movement of the record sheet, so that the distance between two successive recording positions on a magnetic track is constant.

In a sixth arrangement according to the invention, the recording on the main track may comprise marks representing the balance of the account, marks representing the sign of this balance and marks representing the number of the account.

In a seventh arrangement according to the invention, the marks representing the number of the account, which are magnetically recorded in the course of a preceding operation, position mechanical storage devices, the registration of which is compared with that of accumulating or registering wheels positioned by the direct typing of the account number on the keyboard of the machine.

In an eighth arrangement according to the invention, the record sheet does not bear any visible impression of the account number.

The auxiliary track performs the function of a synchronising track, and it is essential to locate during the reading of the main track the recording positions which do not bear any marks, which is effected by the counting of the marks on the auxiliary track.

The device according to the invention will be applied by way of example to a machine operating with a record sheet as described in the specification of United States patent application filed September 13, 1955, under Serial No. 534,117, now abandoned, at least in so far as the magnetic recording is not concerned. It will therefore be assumed that the machine in which the present invention is embodied comprises accumulating wheels positioned with the aid of a keyboard, which wheels may in addition be actuated position-by-position by energisation of an electro-magnet under the control of reading pulses emanating from the magnetic head during the introduction of the record sheet into the machine. Each wheel has 10 positions corresponding to the digits 0, 1, 2, 3, 4, 5, 6, 7, 8, 9. In addition, the device comprises a trackwise erasing head which removes the recording after each reading, which erasing head may be combined with the reading and recording head.

Figure 4:
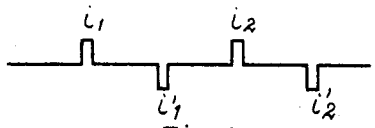
Figure 5:
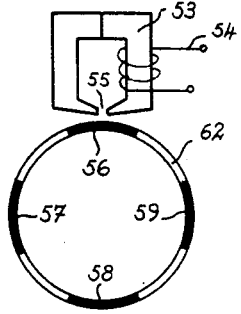
Figure 2:
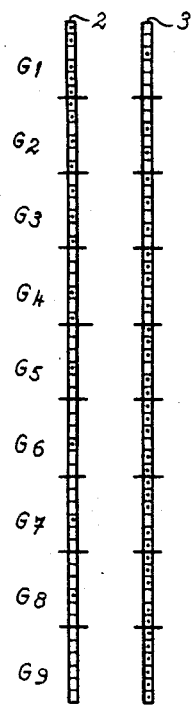
Figure 6:
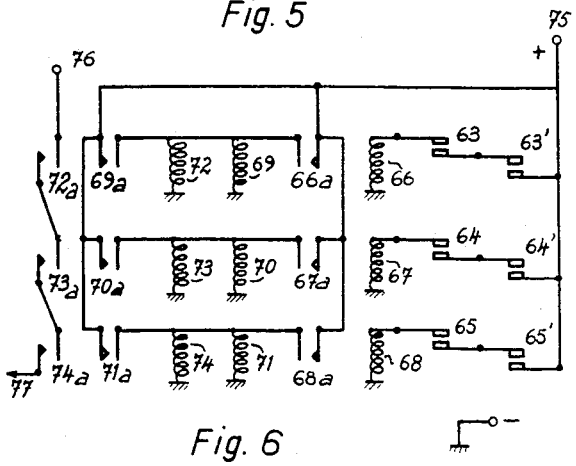
Figure 7:
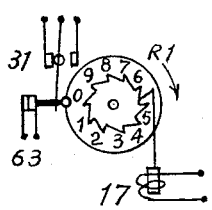
Figure 3B:
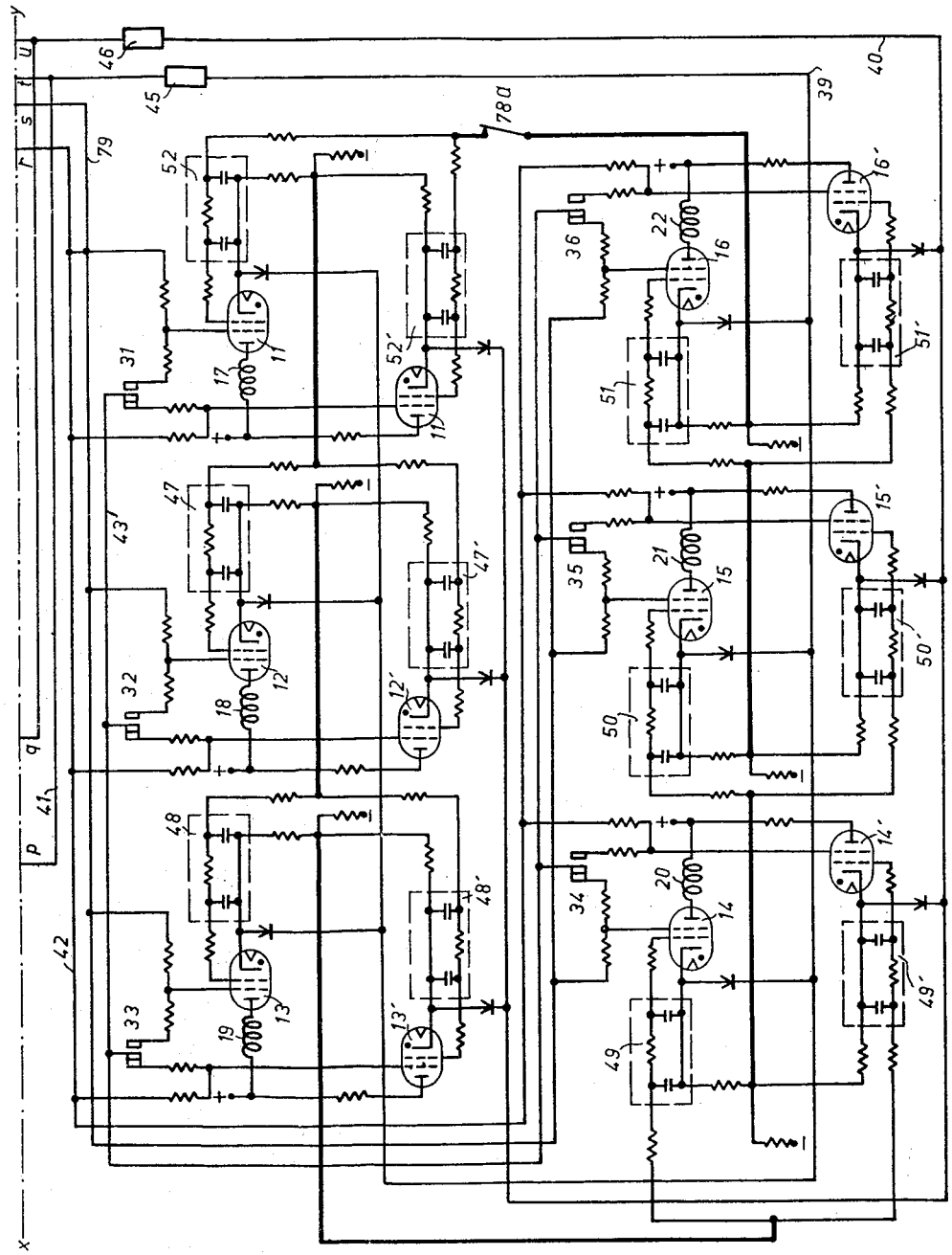

For a better understanding of the invention, the same will now be described with reference to the accompanying drawings, in which:

FIGURE 1 shows a record sheet used in a machine,
FIGURE 2 shows the method of recording adopted, in diagrammatic form,
FIGURE 3 is a diagram showing how FIGURES 3a and 3b are to be joined,
FIGURES 3a and 3b, joined along the line xv, constitute a diagram of a device for reading and recording magnetic marks,
FIGURE 4 shows the pulse train supplied by a pulse generator for controlling the magnetic recording,
FIGURE 5 shows diagrammatically a form of construction of the said pulse generator, FIGURE 6 is an electric circuit diagram of a device for comparing account numbers, and FIGURE 7 is a schematic view of a registering wheel.

In all of these figures, like elements bear the same reference numerals.

In FIGURE 1, the record sheet is shown at 1, the magnetic tracks at 2 and 3 and the different printing columns at 4, the sheet bearing no printed indication of the account number. The tracks 2 and 3, which are parallel to the shorter side of the sheet, consist of a magnetizable material.

The method of recording is illustrated in FIGURE 2. The two tracks 2 and 3 comprise positions separated by horizontal lines and combined in groups of six in the example chosen, in which the number of digits to be recorded is equal to 6. There are nine such groups, numbered from $G_1$ to $G_9$. By way of example, FIGURE 2 shows the recording of the number 418032, the positions bearing magnetic marks containing a dot. The digit 2, for example for the units of the number, is represented on the track 2 by the marks of the first positions of the groups $G_1$ and $G_2$, the digit 3 of the tens by the marks of the second positions of the groups $G_1$, $G_2$ and $G_3$, etc. There corresponds to each digit a number of marks equal to its decimal value, but the distance between two marks constituting one and the same digit is equal to as many positions as there are digits to be recorded. The marks of the auxiliary track 3 are complementary to those of the track 2 in the sense that there corresponds to a marked position on the track 2 an unmarked position on the track 3 and vice versa, the sum of the marks of the two tracks being constant and equal to 54.

The method of recording and reading such marks will now be described with reference to FIGURES 3a and 3b. In these figures, the elements 4 and 5 are main and auxiliary magnetic heads, which read respectively the recordings on the tracks 2 and 3 of FIGURE 2, the elements 24, 25, 26 being amplifiers, the elements 23 and 44 pulse generators, and the elements 27 and 28 amplifiers of a particular type. The circuit arrangement also comprises twelve thyratrons 11 to 16 and 11' to 16' forming six pairs. These thyratrons are connected in the form of a double closed chain and constitute a counter based on a known principle whereupon each pulse issued from the generator produces, by way of circuits further described, the successive ionization of an only thyratron of the chain, or in this case a thyratron of a pair, and consequently the extinction of a thyratron of the preceding stage. The anode circuits of the thyratrons 11 to 16 each comprise an exciter coil of an electromagnet which actuates a corresponding accumulating wheel through a plunger core. The said coils are numbered 17 to 22. The anode loads of the thyratrons 11' to 16' are appropriate resistances. The six registering wheels will be designated by $R_1$, $R_2$, $R_3$, $R_4$, $R_5$, $R_6$, an example of which being shown in FIG. 7. The circuit arrangement (FIGS. 3a, 3b) also comprises four bistable multi-vibrators 29, 30, 37, 38, relay contacts 6, 7, 8, 9 (the corresponding energising circuits are manually controlled, for instance on the keyboard of the machine), and contacts mechanically controlled by the movement of the registering wheels 31, 32, 33, 34, 35, 36, as also connecting resistances adapted to the characteristics of the thyratron and various pieces bearing no reference numerals. The function of these members and the connections between them will be further fully described.

The device for reading the magnetic marks will now be described: when the sheet is introduced into the machine, the actuation of the "reading" manual command affects the closing of the contacts 6 and 7, while the contacts 8 and 9 remain opened. By the same action, the thyratron 16' has previously been ionised with the aid of a direct voltage of appropriate value applied a short time to one of its grids by a circuit not shown. The balance has previously been recorded on the two tracks on the said sheet, this balance being, for example, equal to 418,032. The two tracks are read from the top downwards (FIGURE 2). The first reading pulse emanates from the head 4 and acts on the thyratrons 11 to 16, through the closed contact 6, the pulse amplifiers and shape formers 26 and 28 and the multivibrator 30. The circuits 26 and 28 give to a pulse issued from the magnetic head 4 a suitable form and amplitude, in order to set up the multivibrator 30 in its opposite stable state, and to send an appropriate pulse for ionizing one of the thyratrons 11 to 16. These thyratrons are so arranged that the thyratron of rank $n$ may become ionised under the action of the pulse emanating from 30 on the condition that one of the thyratrons of the preceding group of rank $(n-1)$ be ionised though the pulse is applied in parallel by the line 79 to the inputs of all the stages. Such chains of thyratrons used as counter circuits, are well known in the art: an example can be found in the British Patent 593,706 (National Cash Register Co.), which shows an electronic counter ring with thyratrons; the control pulses are applied in parallel to all the stages, but the connections between the cathodes of the tubes are established in order that a pulse ionizes only the thyratron following this one ionized by the preceding pulse. Consequently, this new ionization produces the extinction of the thyratron precedently ionized.

In the present embodiment each stage comprises not one, but two thyratrons connected in parallel. Each pulse ionizes one or the other thyratron of a pair, according to an auxiliary control applied to an auxiliary control grid of the tubes (in the recording process) or to the mode of application of the pulses (in the reading process). For this reason, tetrodes thyratrons are used. But whatever thyratron of a pair is ionized by a pulse, it can effect the extinguishing of the ionized thyratron of the preceding pair. The energizing circuits of the registering wheels are set in the anode circuit of the first thyratrons of each pair, numbered 11 to 16. The second thyratrons of the pairs are numbered 11' to 16'. In addition, means are provided so that the two thyratrons of a pair cannot be simultaneously ionised. Therefore, the first pulse in question ionises the thyratron 11, because of the previous ionization of the thyratron 16', and the anode current of this thyratron energizes the winding 17 and causes the wheel $R_1$ to turn by one position. The thyratron 16' is at the same time extinguished. Similarly, the second pulse, again emanating from the head 4, ionises the thyratron 12 and causes the wheel $R_2$ to turn by one position. The third pulse emanating from the head 5 acts on the thyratrons 11' to 16' through 25, 27 and 29. In the same manner as 26, 28, 30, the circuits 25 and 27 are amplifiers and pulse formers for giving to the pulse issued from the magnetic head 5 a suitable form and amplitude in order to set up the multivibrator 29 in its opposite stable state. It results a pulse which ionizes one of the thyratrons 11' to 16'. The thyratron 13' is then ionised, because of the preceding ionization of the thyratron 12, which does not result in any movement of an accumulating wheel, but brings the thyratrons of the following group 14 and 14' into condition to be fired by the following pulse received. The fourth, fifth and sixth pulses, emanating from the head 4, ionise the thyratrons 14, 15 and 16 respectively and cause the wheels $R_4$, $R_5$ and $R_6$ respectively to turn by one position. The transit through the chain of the counter is thus complete. A second transit of the chain is completed during the reading of the second group of marks $G_2$, FIGURE 2, and so on throughout the duration of the reading of the tracks 2 and 3, the ionisation of the thyratrons being successively effected in the order indicated by the arrows. This process is normally completed at the end of exactly nine turns. In fact, the chain of thyratrons comprises a counter (not shown) for counting said turns, which counter is connected, for example, to the group of thyratrons 11 and 11' and which registers the successive ionisations of one or other of the thyratrons of this group. This counter can be of any type, electronical or electro-mechanical, since its operation speed is slow. In the 9th position it comprises a load circuit, which is the energizing circuit of a relay 78. When the counter registers 9, the energisation circuit of the relay opens the contact 78a and breaks the chain. The digits 2, 3, 0, 8, 1, 4 are then registered in the accumulating wheels $R_1$ to $R_6$. The thyratrons are successively de-ionised by the ionisation of the following thyratrons in the chain. The minimum duration of the energising pulse necessary for ionising a thyratron varies from one tube to another. In addition, this energising pulse must be so short as not to cause the ionization of a plurality of thyratrons of the chain. Therefore, the pulse emanating from the head 4, for example, is transformed by the stage 28 into a rectangular pulse, the duration of which is not sufficient to cause the firing of a thyratron, but which changes over the bistable multi-vibrator 30, which causes the ionization of a new one of the upper thyratrons 11 to 16. A series of outputs of these thyratrons are parallel connected to a circuit 45, which differentiates the output signal each time a thyratron is ionized, in order to supply a short pulse at the beginning of the ionization of the thyratron in question. This pulse, sent to the bistable multi-vibrator 30, provokes its return to the prior state and thus limits the duration of the pulse transmitted thereby. The same process is utilized for the pulses emanating from the head 5 through 25, 27 and 29, outputs of the thyratrons 11' to 16' being connected to a circuit 46 identical with the circuit 45 which supplies a pulse which actuates the multi-vibrator 29 as soon as another one of these thyratrons becomes ionized. In such a construction, the firing of a thyratron therefore exerts an action of self-control due to the feedback circuit between the assembly of upper or lower thyratrons and the corresponding bistable multi-vibrators 30 or 29. Since the triggering is nevertheless not instantaneous, a short pulse could be transmitted to the following group of thyratrons and produce an untimely ionization of one of them. Therefore, delay lines 47 to 52 and 47' to 52' are provided between the groups so as to delay the signals thus generated until the commencement of the following triggering of the corresponding bistable multi-vibrators 29 or 30.

The object of the recording on the auxiliary track will now be clearly apparent. If the device comprises only one recording track and a single chain of thyratrons, the recording positions having no marks would not ionise the corresponding thyratrons and consequently the chain of thyratrons would count marks applied to the track and not pulse positions. In the device according to the invention, this synchronisation must in addition be a function of the speed of the sheet.

The recording is effected during the extraction of the account sheet with the aid of an alternator 23 coupled to the motor driving the paper. This alternator supplies pulses $i_1$, $i'_1$, $i_2$, $i'_2$, etc. of alternate polarity, as illustrated in FIGURE 4. Such an alternator is diagrammatically illustrated in FIGURE 5. It comprises a magnetic circuit 53 with an air gap 55, a winding 54 fed with direct current and a rotating cylindrical non-magnetic member 62 on which are mounted a series of plates 56, 57, 58, 59 consisting of magnetic material. The reluctance of the magnetic circuit varies periodically and creates alternately positive and negative pulses in the circuit 54, which coincides with the beginning and the end of the passage of the plates past the air gap 55. With four plates, for example, four positive pulses and four negative pulses will be obtained to each revolution of the member 62. In the device according to the invention, the member 62 is driven by the movement of the paper, i.e. the cylindrical member 62 is rotating at a speed multiple of that of the driving motor of the sheet, the speed multiplication being such that a turn of the member 62 corresponds to the passage of two marks before the magnetic head. It will be hereinafter shown how a group of a positive and a negative pulses $i_1$, $i'_1$ or $i_2$, $i'_2$ . . . causes the sending of an only positive pulse of suitable shape and duration on the magnetic head 4 or 5 in order to record apposed marks at equidistant positions on the corresponding tracks of the sheet. In other words, the recording of a number comprising only digits 9 would result in a series of equidistant marks on the track 2 (the track 3 bearing no mark). This results from the fact that the pulses emitted by the alternator are synchronised with the movements of the sheet. Such an arrangement is essential by reason of the considerable variations of the speed of the sheet, both during the extraction of the sheet and during successive extractions. If this arrangement were not present, it might not be possible for the marks to be completely recorded or they might be too close together at certain points. The contacts 31 to 36 are actuated by the registering wheels $R_1$ to $R_6$, so that they pass from their normal to their transferred positions when the corresponding wheel passes through the position 0. The contact 32, for example, will be at its normal position when the wheel $R_2$ records any digit different from zero and at its transferred position when it records the digit 0. The wheels comprise, as may be seen on FIG. 7, a boss at the position zero, which moves the corresponding contact. All the movable blades of these contacts are connnected to a terminal 10 which is connected to a negative biasing voltage source only during recording operations, under the action of the commutations controlled by the "recording" manual command. The magnetic recording of the number 418032 is then effected in the following manner. In the course of a previous operation the wheels $R_1$ to $R_6$ have been positioned on the digits 8, 7, 0, 2, 9, 6 which are the respective tens-complements of the digits to be recorded. It is well known that true values may be read out from registered complementary values which can be nines- or tens-complements of the true digits to be recorded. At the commencement of the ejection of the sheet, the alternator 23 is started. The actuation of the "recording" manual command effects the opening of the contacts 6 and 7 and the closing of the contacts 8 and 9. As the wheel $R_1$ registers the digit 8, the contact 31 is in its inoperative position. The first pulse of the alternator 23 simultaneously causes the bistable multi-vibrators 29 and 30 to change-over, whereby a pulse is simultaneously set up at the lines 79 and 42, but the voltage source connected to 10 biases a control grid of the thyratron 11' and blocks it. Therefore, only the thyratron 11 is ionised (as in the reading phase, the thyratron 16' has previously been ionized, this initial condition being obtained by the commutations controlled by the "recording" manual command, or if desired, by the commutations controlled by a "zero" key on the keyboard). The anode current of this thyratron feeds the coil 17 and the wheel $R_1$ will rotate by one position, so as to bring this wheel from 8 to 9. At the same time, the bistable multi-vibrator 37 receives through 39 and 45 a pulse resulting from the variation of anode current of the thyratron 11. It changes over and sends an amplified pulse to the magnetic head 4. The second positive pulse from the generator 23 similarly produces two pulses at the lines 79 and 42. As the wheel $R_2$ registers the digit 7, the contact 32 is in its normal position, and the thyratron 12' is therefore blocked by 10, and under these conditions the thyratron 12 becomes ionised, so that the coil 18 is fed and causes the wheel $R_2$ to turn by one position, from 7 to 8 position. At the same time, as in the foregoing, a pulse is sent to the head 4. The contact 33 is in its transferred position, since the wheel $R_3$ registers 0. The thyratron 13 is blocked by 10 and consequently the thyratron 13' becomes ionised by the third pulse from 23, which does not result in any movement of the wheel $R_3$. As a consequence of the increase of anode current of the thyratron 13', a pulse is sent to the bistable multi-vibrator 38 through 40, 46. This multi-vibrator changes over and sends a pulse to the head 5. The same process takes place for the following pulses. The recording illustrated in FIGURE 2 is therefore effected on the tracks 2 and 3 and the registering wheels are returned to zero position-by-position. The pulses transmitted from the bistable multi-vibrators 29 and 30 are, as in the reading phase sent to the parallel input of the thyratrons; the ionisation of a thyratron of the chain produces an output signal which is differentiated in the circuit 45 or 46 in order to generate appropriate pulses sent to the multivibrators 29 and 30 and on the other hand to the multi-vibrators 37 and 38. The magnetising multi-vibrators 37 and 38, are changed over a first time under the effect of pulses coming from 45 and 46, and change over in the opposite direction under the action of the first negative pulse supplied by the generator 23 and transmitted from the second output of the amplifier circuit 24, thus the circuit 24 has two outputs, the first one sending only the positive pulses $i_1$, $i_2$ . . . to the multi-vibrators 30 and 29, and the second one sending only the negative pulses $i'_1$, $i'_2$ to the multi-vibrators 38 and 37. It will be clear upon reference to FIGURE 4 that a positive pulse $i_1$, for example, controls the ionisation of a thyratron, which in turn controls the first change-over of a magnetising multi-vibrator, while the following negative pulse $i'_1$ controls the second change-over of this multi-vibrator, thus limiting the pulse applied to one of the magnetic heads 4 or 5 to a duration approximately equal to the time interval separating the pulses $i_1$ and $i'_1$.

The device described in the foregoing permits of checking the recording. In the example chosen, the number of marks recorded must be equal to 54. At the time of the reading, a pulse counter connected in parallel with circuits extending from the heads 4 and 5 counts the marks emanating from either one of the tracks and stops the machine if the number of pulses thus counted is not equal to 54. The machine is also stopped if marks are simultaneously read. This counter could be connected for instance in parallel to the outputs of the amplifiers 28 and 27, and it could be realized with two counting rings of vacuum or gas-filled tubes of classical type. The double chain of thyratrons may rather be used for this purpose, any pulse emanating from one of the magnetic heads producing the ionisation of one of a pair of thyratrons in the said chain. The aforementioned turn counter, which counts a loop turn after 6 marks, would be additionally used for counting 9 turns. Besides an auxiliary circuit which would be a single "Not AND" logical circuit, in parallel at the output of 27 and 28, would indicate if two pulses were simultaneously sent from the heads 5 and 4, in order to stop the machine in this case.

The device according to the invention also comprises a means of checking the account number. For this purpose, a number of accumulating wheels are allocated solely to the magnetic recording of the account number. By way of example, it will be assumed that these are the wheels $R_4$ to $R_6$. The wheels $R_1$ to $R_3$ are allocated both to the balance and to the account number in accordance with an arrangement which will be described (in this example, the balance and the number of the account have at the most three digits). These wheels $R_1$ to $R_3$ may in addition be positioned in certain cycles by the striking of numbers on the keyboard of the machine and, when they are returned to zero, their contents can be mechanically transferred to other wheels, for example printing wheels or auxiliary mechanical storage devices. In the following description, the wheels $R_1$ to $R_3$ will be called the operating wheels and the wheels $R_4$ to $R_6$ the account number wheels. The principle of this control is then as follows: at a certain cycle of the machine, the operating wheels are mechanically returned to zero, while the account number wheels already contain the registration of the account number following the magnetic reading of that part of the tracks 2 and 3 which is allocated to the account number, in accordance with the method hereinbefore described. At the following cycle, the account number read on the paper, such as a cheque, docket etc., forming the subject of the new entry is struck by the operator on the keyboard of the machine and mechanically registered in the operating wheels. In the following cycle, the registrations of the operating wheels and of the account number wheels are compared by electronic and electrical means hereinafter described. If these registrations are different, the machine is stopped, otherwise it can continue to operate. A difference between these registrations obviously emanates from the fact that the operator has chosen a sheet which does not correspond to the account being dealt with. In order that this check may be effective, the record sheet contains no visible impression of the account number, the identification of the account on this sheet being effected, for example, by the name of the holder of this account. In the course of this comparison, the operating wheels and the account number wheels perform a complete revolution, so as to return to their initial positions. In a subsequent cycle, the operating wheels will be returned to zero, so as to be able to register the balance again, while the mechanical registration of the account number by the account number wheels will be used for the magnetic recording of this number on the tracks 2 and 3. It is to be noted that in this device, the account number is erased at each extraction of the sheet and consequently it is necessary to re-record it at each operation. The comparison between the two registrations of the operating wheels and of the account number wheels will now be described with reference to FIGURES 3a, 3b and 6. A pulse generator 44 emits 60 pulses, i.e. ten times the number of wheels $R_1$ to $R_6$, and these pulses are sent through 28 and 30 to inputs of the thyratrons 11 to 16 (the generator 23 cannot be used in this operation because its emission is dependent upon the movement of the sheet, which is stationary in this comparing operation). At the same time, the negative voltage source connected to the terminal 10 is disconnected, so that the contacts 31 to 36 no longer play any part. The successive pulses arriving through the line 79, in accordance with the process hereinbefore described, successively ionise the thyratrons 11 to 16 and at the same time cause the wheels to turn position-by-position, but with the feature that the wheels continue to turn after they have passed the zero position, the device for blocking the thyratrons 11 to 16 provided in the magnetic recording of the balance being disconnected. At the end of 60 pulses, each thyratron 11 to 16 will have been ionised ten times and the corresponding wheels will have effected a complete revolution. The process of comparison consists in verifying that the corresponding wheels $R_1$ and $R_4$, $R_2$ and $R_5$, $R_3$ and $R_6$ simultaneously pass through the zero position. This condition will obviously be satisfied only if the initial registrations of the two groups of wheels $R_1$, $R_2$, $R_3$ and $R_4$, $R_5$, $R_6$ were the same. In FIGURE 6, the contacts 63 to 65 are respectively under control of registering wheels $R_1$ to $R_3$, an example being shown in FIG. 7 for $R_1$, and contacts 63' to 65' are respectively under control of registering wheel $R_4$ to $R_6$. The terminal 75 is connected to the positive pole of a direct-current source. The simultaneous passage of the wheels $R_1$ and $R_4$ through zero produces the simultaneous closing of the contacts 63 and 63', whereby the relay 66 is energised and the contact 66a closes. The relays 69 and 72 are then energised, closing the contact 69a and 72a. The closing of the contacts 69a maintains the relay 72 in the energised state and consequently maintains the contact 72a in the closed position. The simultaneous passage of the wheels $R_2$ and $R_5$, $R_3$ and $R_6$ through zero produces the same closing of the contacts 73a and 74a so that a circuit 76, 77 is established between, for example, a voltage source and a circuit for releasing the machine, controlled by the said voltage source. If the passage of any two corresponding wheels through zero is not simultaneous, the circuit in question is not established and the machine is locked.

Many modifications are possible within the scope of the invention. As a safety measure, the magnetic tracks 2 and 3 can be doubled, so that the sheet then comprises four tracks connected in parallel in pairs. The auxiliary track could be omitted provided that an auxiliary pulse train were generated synchronously with the movement of the sheet during its extraction.

I claim:

1. Device for magnetically recording coded digits or symbols in the form of magnetic marks on a magnetic track of a record sheet adapted to be moved in front of a magnetic head fed by pulses generated by a pulse generator, comprising several digit registering wheels initially positioned on digits to be recorded, an electronic pulse ring counter having a first and a second switching circuit in each stage, each pair of switching circuits being connected to one of said registering wheels, control means for said switching circuits receiving the pulses of said generator and energizing a switching circuit of a pair, one pair after the other, the first switching circuit of a pair being energized when the registering wheel connected to said pair to be operated is not positioned on zero and the second switching circuit of a pair being energized when the connected registering wheel is positioned on zero, means for generating a control pulse when any of said first switching circuits of said pairs is energized, said control pulse feeding the magnetic head and shifting by one step the corresponding digit registered in said registering wheel except in the case when this digit is equal to zero.

2. Devices for magnetically recording coded digits or symbols in the form of magnetic marks on two margnetic tracks of a record sheet adapted to be moved in front of a first and a second magnetic head fed by pulses generated by a pulse generator, comprising several digit registering wheels initially positioned on the digits to be recorded, a first and a second electronic pulse ring counter of n stages each having n switching circuits, each switching circuit of the first counter being connected to a switching circuit of the second counter, said pairs of triggers being each connected to one of said registering wheels, control means for said pairs receiving the pulses of said generator and energizing a switching circuit of a pair, one pair after the other, a pulse energizing a switching circuit of the first counter, when the registering wheel connected to said pair is not positioned on zero and the switching circuit of the second counter of the same pair when the registering wheel connected to said pair is positioned on zero, means for generating a first control pulse when any of said switching circuits of the first counter are energized, said first control pulse feeding the first magnetic head and shifting by one step the corresponding digit registered in said registering wheel except in the case when this digit is zero, means for generating a second control pulse when any of said switching circuits of the second counter is energized, said second control pulse feeding the second magnetic head.

3. Device of the character described in claim 5 for reading an account number which has been magnetically recorded on the record sheet, said device including reading out means for reading out magnetic marks of the record, a first group of reigstering wheels positioned under the control of the pulses delivered by said reading out means when reading out the magnetic record of said account number, a second group of registering wheels previously positioned on said account number, comparison means connected to compare the position of both sets of registering wheels, means for stopping the magnetic record when said positions are not identical.

4. In an accounting machine having registering wheels positionable inter alia by individual stepping electromagnets to register a number n of digit values and feed means for feeding a sheet bearing magnetizable tracks, a recording control arrangement comprising: a recording magnetic head associated to one magnetizable track, a pulse generator synchronized with said feed means for emitting control pulses; a ring counter arrangement composed of a number n of loop-connected stages, each stage being associated to a different one of said registering wheels and comprising first and second ionizable discharge valves, each first valve being connected for energizing, when fired, an associated one of said electromagnets to actuate the corresponding wheel by one step, first connecting means for applying the pulses from said generator to control inputs of first and second valves of all of said stages, connecting means and switching devices connected and settable individually in accordance with the positioning of associated ones of said wheels to select for firing either the first valve when the associated wheel is positioned on a significant digit value, or the second valve when the associated wheel is positioned on the zero digit value, and connecting means for connecting output terminals related to said first valves of all stages in parallel to a gating device, whereby a recording pulse is transmitted to said magnetic head each time a new one of said first valves becomes fired.

5. Recording control arrangement according to claim 4, comprising a second recording magnetic head associated to a second magnetizable track, and further connecting means for connecting output terminals related to said second valves of all stages in parallel to said second gating device, whereby a recording pulse is transmitted to a second magnetic head each time a new one of said second valves becomes fired.

6. Recording control arrangement according to claim 5 wherein said first connecting means comprises two channels, each including a bi-stable trigger circuit which is switched from a first conduction state to a second conduction state when transmitting a pulse to the control inputs of a related group of said valves, a control input of said trigger circuit being connected to receive a pulse from the corresponding output terminals of said group of valves so as to be reset to said first conduction state when any one of said valves has been fired.

7. In an accounting machine having registering wheels positionable inter alia by individual stepping electromagnets to register a number n of decimal digit values and sheet feed means for feeding a sheet bearing magnetizable tracks, the combination of: a recording magnetic head associated to one of said tracks, a pulse generator synchronized with said feed means for generating a recording pulse during a pulse time period, a ring counter arrangement having a number n of stages, each stage being associated to a different one of said registering wheels and comprising first and second gas filled valves, each first valve being connected, for energizing, when fired, an associated one of said electro-magnets to actuate the associated registering wheel by one step in the course of several such pulse time periods, first connecting means for applying the pulses from said generator to firing inputs of said first and second valves of all of said stages, connecting means and switching devices connected and settable individually in accordance with the positioning of associated ones of said wheels to select for firing either a first or a second valve according to whether said associated wheel is positioned on a significant value or on a zero value, and connecting means for connecting output terminals related to said first valves of all stages in parallel to a gating device, whereby a recording pulse is transmitted to said magnetic head each time a new one of said first valves becomes fired.

8. The combination set forth in claim 11 comprising a second recording magnetic head associated to a second magnetizable track, and further connecting means for connecting output terminals related to said second valves of all stages in parallel to said second gating device, whereby a recording pulse is transmitted to a second magnetic head each time a new one of said second valves becomes fired.

9. The combination set forth in claim 8, wherein said first connecting means comprise two channels, each including a bi-stable trigger circuit which is switched from a first conduction state to a second conduction state when transmitting a pulse to the control inputs of a related group of said valves, a control input of said trigger circuit being connected to receive a pulse from the corresponding output terminals of said group of valves so as to be reset to said first conduction stage when any one of said valves has been fired.

References Cited in the file of this patent
UNITED STATES PATENTS

| | | |
|---|---|---|
| 2,512,038 | Potts | June 20, 1950 |
| 2,597,428 | Bachelet | May 20, 1952 |
| 2,808,650 | Kumagai | Oct. 8, 1957 |